Feb. 21, 1933.   R. B. BERG   1,898,809
PROCESS FOR CLEANING METAL OBJECTS
Filed Sept. 16, 1929
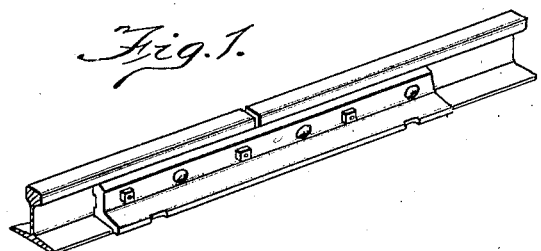
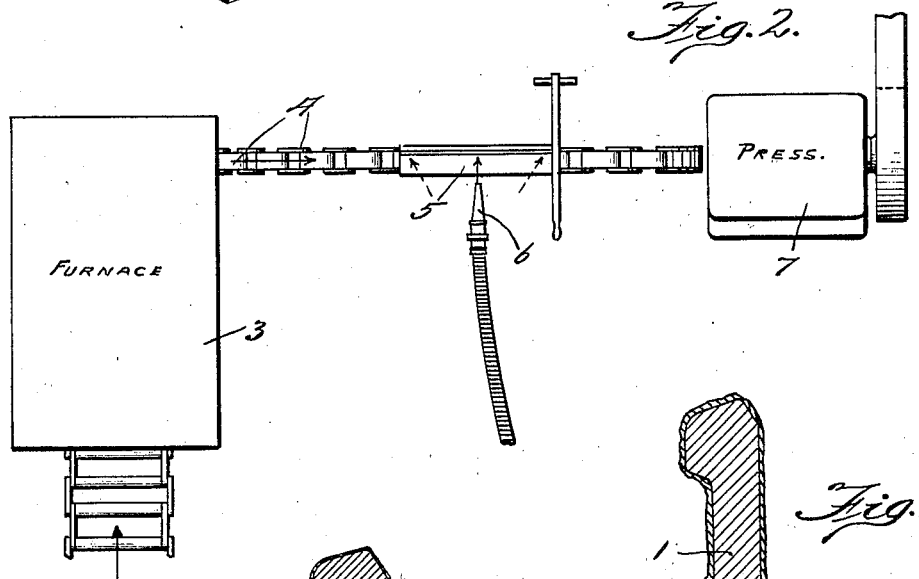
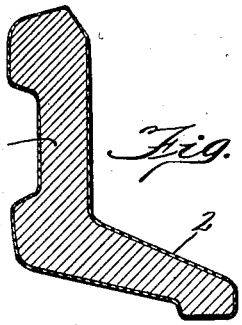
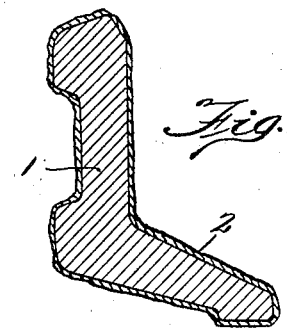
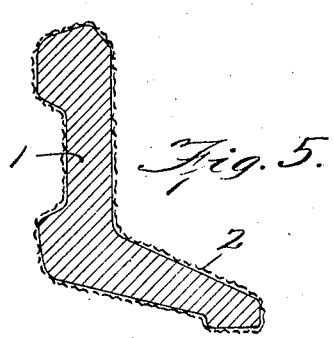
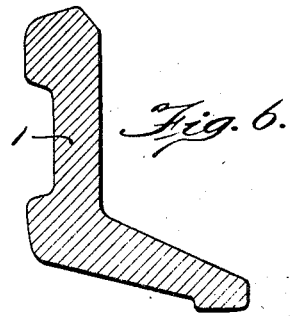
Inventor:
Robert B. Berg
By Arthur F. Durand
Atty.

Patented Feb. 21, 1933

1,898,809

UNITED STATES PATENT OFFICE

ROBERT B. BERG, OF AURORA, ILLINOIS, ASSIGNOR TO NATIONAL RAIL JOINT CORPORATION, OF CHICAGO, ILLINOIS, A CORPORATION OF ILLINOIS

PROCESS FOR CLEANING METAL OBJECTS

Application filed September 16, 1929. Serial No. 392,897.

This invention relates to the re-forming of metal objects such as the splice bars or fish plates for rail joints, or other metal objects that become worn and distorted by use, and that are susceptible of re-forming or re-shaping to make them suitable for further use.

Generally stated, the object of the invention is to provide a novel and improved process or method for cleaning the splice bars or fish plates or other metal objects, as an intermediate step between the heating of the metal objects and the ultimate re-forming or re-shaping thereof, whereby to remove the dirt and scale and other substances from the metal objects before they are re-formed or re-shaped, by the momentary direction of a powerful jet of water against the heated splice bars or fish plates or other metal objects, thereby driving or forcing the dirt and scale, or other substances, off the surface of the bar or other object to be re-formed or re-shaped, but without chilling the bar or other object sufficiently to interfere with the subsequent re-forming or re-shaping thereof in the desired manner.

To these and other useful ends, the invention consists in matters hereinafter set forth and claimed and shown in the accompanying drawing, in which—

Fig. 1 is a perspective of a rail joint having splice bars or fish plates of the kind that may be re-formed or re-shaped by a process or method embodying the principles of the invention;

Fig. 2 is a plan view of apparatus suitable for practicing the said process or method of re-forming or re-shaping old splice bars or fish plates or other metal objects;

Fig. 3 is an enlarged cross section of a rail joint splice bar before it is heated to the required temperature;

Fig. 4 is a similar cross section of the bar after it is heated;

Fig. 5 is a similar cross section of the bar during the impingement thereon of the jet of water;

Fig. 6 is a similar section showing the bar thoroughly cleaned and ready for re-forming or re-shaping.

As thus illustrated, the invention comprises the selection of old and worn splice bars or fish plates 1, as shown in Fig. 3, having a coating 2 thereon of metal scale, rust, dirt and oil, all usually caked hard on the surface of the bar or fish plate. Such bars or fish plates are first heated to a high temperature, thereby to some extent reducing the coating, as shown in Fig. 4 of the drawing. After that, a powerful jet of water is directed upon the surfaces of the bar or fish plate, with the result that the coating is cracked up and scaled off, the water and steam being driven through the cracks and under the coating, so that it is, in effect, blown off and forced off the surfaces of the splice bar or fish plate. Fig. 5 shows the coating cracked up and about ready to be forced off by the water and steam, and Fig. 6 shows the bar thoroughly cleaned and with no scale or coating thereon. After that, the bar or fish plate may be re-formed or re-shaped by any suitable or desired means, in any suitable or desired manner, depending upon what sort of re-formed or re-shaped bar or plate is desired.

Fig. 2 shows an apparatus suitable for the practicing of the said method or process. In this apparatus, the furnace 3 for heating the bars or plates or other objects may be of any suitable or desired character, or of any well known form. The heated bars or other objects are then fed by the belt or other means 4 to a table or support 5 upon which the bar or fish plate may be manipulated while a jet of water from the hose nozzle 6 is being directed thereon. The treatment in this way with a powerful jet of water is only momentary, just sufficient to crack up and drive off the scale and dirt and oil, forming the caked coating on the bar or plate, and such treatment with water does not cool the bar or plate enough to interfere with the subsequent re-forming or re-shaping thereof. This re-forming or re-shaping operation may be performed in a press 7 of any suitable character, or by any suitable or desired means, depending upon the size or shape desired for the re-formed bar or plate.

In the re-forming or re-shaping of splice bars or fish plates, and other metal objects such as railroad car springs, and other things that accumulate dirt and rust and perhaps oil, it is important to have the coating thoroughly removed before the bar or plate or other object is re-formed or re-shaped. The mere heating of the bar or other object does not remove the coating, except only slightly, and if the bars or other objects are then put in the press or other means for re-forming or re-shaping them, the coating will seriously interfere with the desired results. Various methods, such as brushing the bars or other objects with steel brushes, after they are heated, have been tried, but without the desired effect, and they have even been put in tumbling barrels and tumbled about, in an effort to clean them, but these methods have not been satisfactory. Therefore, by directing a powerful jet of water against the surfaces of the bars or other objects, after they have been heated to a high temperature, it is found that the coating of dirt and rust and more or less oil is, in effect, forced and blown off the surfaces of the bars or other objects, leaving them clean for the subsequent re-forming or re-shaping operation. This action of the water will even remove the metal scale which usually exists in a thin layer between the dirt and rust coating and the clean metal of the bar or other object, but for the purpose of re-forming or re-shaping the bars or other objects, the removal of such scale is perhaps not of great importance, although it does, in fact, occur by the use of water in the manner explained. In any event, the water method of cleaning, as described, does wash or blow off the coating of rust and dirt and more or less oil, sometimes caked so hard on the bars or other objects that it is almost impossible to scrape it off with tools or steel brushes, thus leaving the bars or other objects clean and ready for the re-forming or re-shaping operation.

While the invention is shown and described in connection with splice bars or fish plates, it is obvious that this method of re-forming and re-shaping old and worn metal articles can be employed in connection with metal objects of various kinds, without departing from the spirit of the invention, although it is more particularly valuable in connection with the re-forming or re-shaping of old splice bars or fish plates.

Of course, splice bars and fish plates are subject to severe weather conditions, causing them to rust and become covered with dirt and sand, and, in addition, grease and oil is continually dripping from the bearings and other parts of the rolling stock. This mixture of grease and oil with sand and dirt and rust becomes hard and forms a coating on the bars or plates that is difficult to remove, but which does succumb to the water method shown and described.

Ordinarily, it is found that the bars or plates or other objects are not cooled sufficiently, by the application of water, to in any way interfere with the prompt re-forming or re-shaping of the heated and cleaned objects. However, if it is found that the application of water does at times chill or cool the metal objects too much, they can be heated again to the required temperature, before inserting them in the press or die mechanism or other means by which the re-forming or re-shaping operation is performed.

Among the advantages of this method are the following:

It permits the metal to flow to its proper place within the die mechanism, because of the absence of any thick scale or coating which might prevent the proper flowing or distribution of the metal in the die. Furthermore, the re-formed or re-shaped bar or plate has clean metal to metal contact with the rail when put in place, because of the absence of any scale or coating on the bearing surfaces of the bar or plate. Again, after the bars are completely re-formed and finished, without any scale thereon, it is then very easy to see and detect cracks in the bars or plates. The method described and shown is thus calculated to increase the life of the dies or other means for re-forming or re-shaping the bars or plates. In addition, the water method described is less expensive than the other methods or processes heretofore employed or proposed for this purpose.

What I claim as my invention is:

The method or process of cleaning surfaces, preliminary to re-forming or re-shaping used metal objects that have become coated with dirt or rust, or other substances, caked on the surface of the metal objects to be re-formed or re-shaped, comprising the heating of said objects to a high temperature, with said coating thereon, thereafter directing a strong jet of water upon the highly heated objects, thereby cracking up and forcing off and washing away the said coating on said objects, thereby to facilitate the subsequent re-forming or re-shaping of said objects in the desired manner.

Specification signed this 27th day of August, 1929.

ROBERT B. BERG.